(12) United States Patent
Hamada

(10) Patent No.: US 10,542,194 B2
(45) Date of Patent: Jan. 21, 2020

(54) DISPLAY CONTROL APPARATUS AND METHOD FOR CONTROLLING THE SAME TO DISPLAY TIME-LIMITED OBJECT AT FIRST AND SECOND ATTITUDES FOR FIRST AND SECOND PERIODS

(71) Applicant: CANON KABUSHIKI KAISHA, Tokyo (JP)

(72) Inventor: Naru Hamada, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 189 days.

(21) Appl. No.: 15/608,724

(22) Filed: May 30, 2017

(65) Prior Publication Data

US 2017/0353632 A1 Dec. 7, 2017

(30) Foreign Application Priority Data

Jun. 1, 2016 (JP) .................................. 2016-110353

(51) Int. Cl.
*H04N 5/225* (2006.01)
*H04N 5/91* (2006.01)
(Continued)

(52) U.S. Cl.
CPC ............. *H04N 5/225* (2013.01); *G03B 17/20* (2013.01); *G09G 3/36* (2013.01);
(Continued)

(58) Field of Classification Search
CPC .... H04N 5/225; H04N 5/772; H04N 1/00015; H04N 5/23293; H04N 5/91; H04N 5/92;
(Continued)

(56) References Cited

U.S. PATENT DOCUMENTS 6,262,769 B1 * 7/2001 Anderson .......... H04N 1/00437
348/231.99
7,932,882 B2 * 4/2011 Shimotono ............. G06F 1/162
345/649
(Continued)

FOREIGN PATENT DOCUMENTS

JP 2002262134 A 9/2002
JP 2007201539 A 8/2007

*Primary Examiner* — Padma Haliyur
(74) *Attorney, Agent, or Firm* — Canon USA, Inc., IP Division

(57) ABSTRACT

A display control apparatus includes an attitude detection unit and a display control unit. The attitude detection unit is configured to detect an attitude of a display unit. The display control unit, in a case where the attitude of the display unit detected by the attitude detection unit is a first attitude, is configured to display a certain display object on the display unit and after having displayed the certain display object for a first period to cancel display of the certain display object, and in a case where the attitude of the display unit detected by the attitude detection unit is a second attitude different from the first attitude by 90 degrees, is configured to display the certain display object on the display unit and after having displayed the certain display object for the first period not to cancel display of the certain display object.

18 Claims, 9 Drawing Sheets

(51) Int. Cl.
*H04N 1/00* (2006.01)
*G03B 17/20* (2006.01)
*G09G 3/36* (2006.01)
*H04N 5/232* (2006.01)
*H04N 5/907* (2006.01)
*H04N 5/92* (2006.01)

(52) U.S. Cl.
CPC ..... *H04N 1/00015* (2013.01); *H04N 5/23293* (2013.01); *H04N 5/907* (2013.01); *H04N 5/91* (2013.01); *H04N 5/92* (2013.01); *G09G 2340/0442* (2013.01)

(58) Field of Classification Search
CPC .. H04N 5/907; G09G 3/36; G09G 2340/0442; G03B 17/20
See application file for complete search history.

(56) References Cited

U.S. PATENT DOCUMENTS

| | | | |
|---|---|---|---|
| 8,451,296 B2* | 5/2013 | Ono | G11B 27/105 345/619 |
| 2014/0153897 A1* | 6/2014 | Hosoe | H04N 5/772 386/230 |
| 2015/0207985 A1* | 7/2015 | Uemura | H04N 5/265 348/333.01 |

* cited by examiner

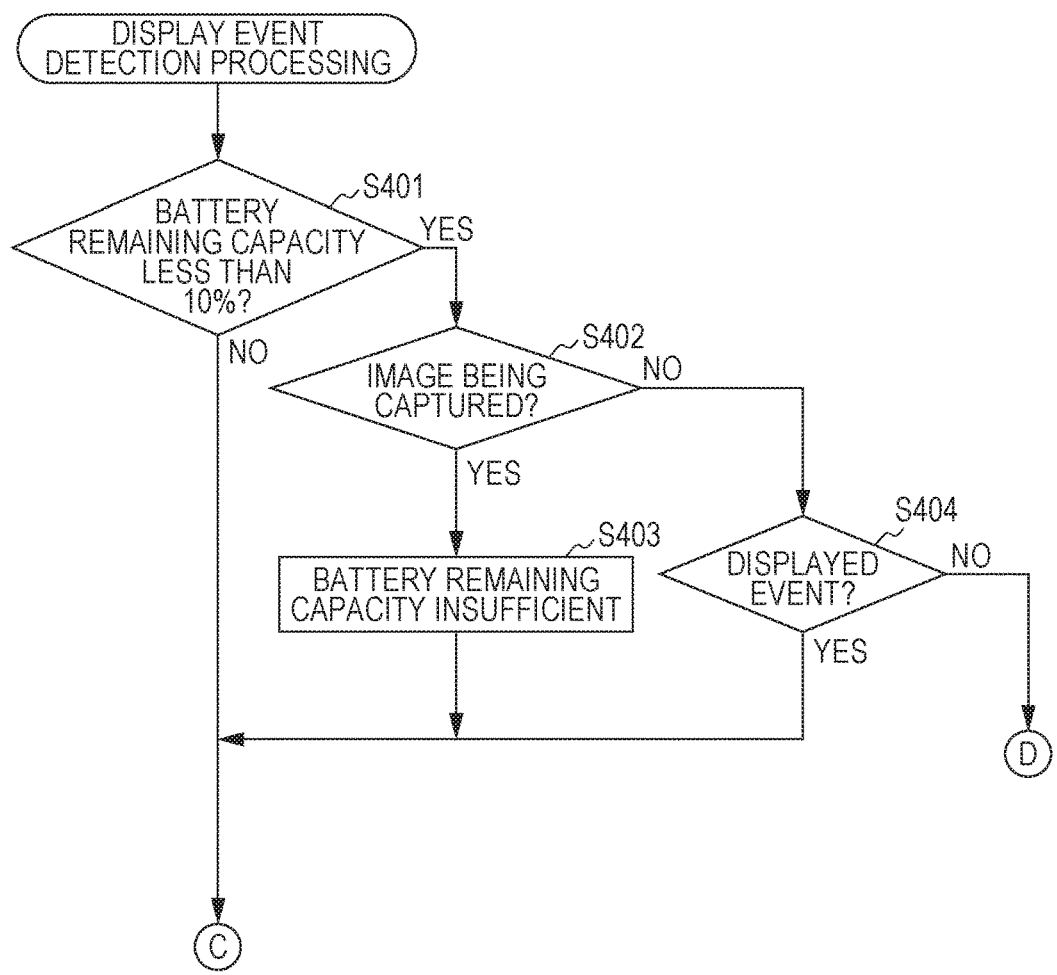

DISPLAY CONTROL APPARATUS AND METHOD FOR CONTROLLING THE SAME TO DISPLAY TIME-LIMITED OBJECT AT FIRST AND SECOND ATTITUDES FOR FIRST AND SECOND PERIODS

BACKGROUND OF THE INVENTION

Field of the Invention

One disclosed aspect of the embodiments relates to a display control apparatus and a method for controlling the display control apparatus, and more particularly, relates to a technique to display a guide for a given period.

Description of the Related Art

In an apparatus including a display unit such as digital camera, a technique to rotate the direction of display for a user to easily see the display according to the attitude, or orientation, of the apparatus has been known. Japanese Patent Laid-Open No. 2007-201539 discloses that, when a digital camera is changed from normal position to vertical position, the layout and the direction of photographing information displayed on the monitor is changed from normal position in which the information is displayed in the horizontally-long area so that the information is displayed in the vertically-long area. In addition, a technique for displaying a content for a user to recognize the content of display while preventing interruption of recognition of other display by displaying a notice or a warning and canceling display of such notice or warning after a predetermined time has been known. Japanese Patent Laid-Open No. 2002-262134 discloses that when five seconds has passed after possible number of picked-up images is displayed in an electronic camera, display of the possible number of picked-up images is cancelled.

When a text is displayed, more characters can be displayed in one line if the display unit is horizontally long. However, when the display unit is rotated so as to be vertically long, in the method of Japanese Patent Laid-Open No. 2007-201539, the width of the display area is narrowed when the digital camera becomes vertical position. Therefore, it will be difficult to read the text since the number of characters displayed in one line is reduced and the text is broken many times. In addition, if the display time is limited as in Japanese Patent Laid-Open No. 2002-262134, display of the text may be cancelled even before the user understands the displayed text.

SUMMARY OF THE INVENTION

In consideration of the problems described above, an object of the embodiments is to provide an electronic apparatus with improved user visibility regardless of the direction of the display unit when a display object with limited display time is to be displayed.

A display control apparatus includes an attitude detection unit and a display control unit. The attitude detection unit is configured to detect an attitude of a display unit. The display control unit, in a case where the attitude of the display unit detected by the attitude detection unit is a first attitude, is configured to display a certain display object on the display unit and after having displayed the certain display object for a first period to cancel display of the certain display object, and in a case where the attitude of the display unit detected by the attitude detection unit is a second attitude different from the first attitude by 90 degrees, is configured to display the certain display object on the display unit and after having displayed the certain display object for the first period not to cancel display of the certain display object.

Further features of the disclosure will become apparent from the following description of exemplary embodiments (with reference to the attached drawings).

BRIEF DESCRIPTION OF THE DRAWINGS

FIGS. 4A and 4B are a flow chart showing display event detection processing according to the present embodiment.

DESCRIPTION OF THE EMBODIMENTS

An exemplary embodiment will be described in detail below with reference to the accompanying drawings.

It is to be noted that the following exemplary embodiment is merely one example for implementing the disclosure and can be appropriately modified or changed depending on individual constructions and various conditions of apparatuses to which the disclosure is applied. Thus, the disclosure is in no way limited to the following exemplary embodiment.

Hereinafter, preferred embodiments will be described with reference to the drawings.

Figure 1A:
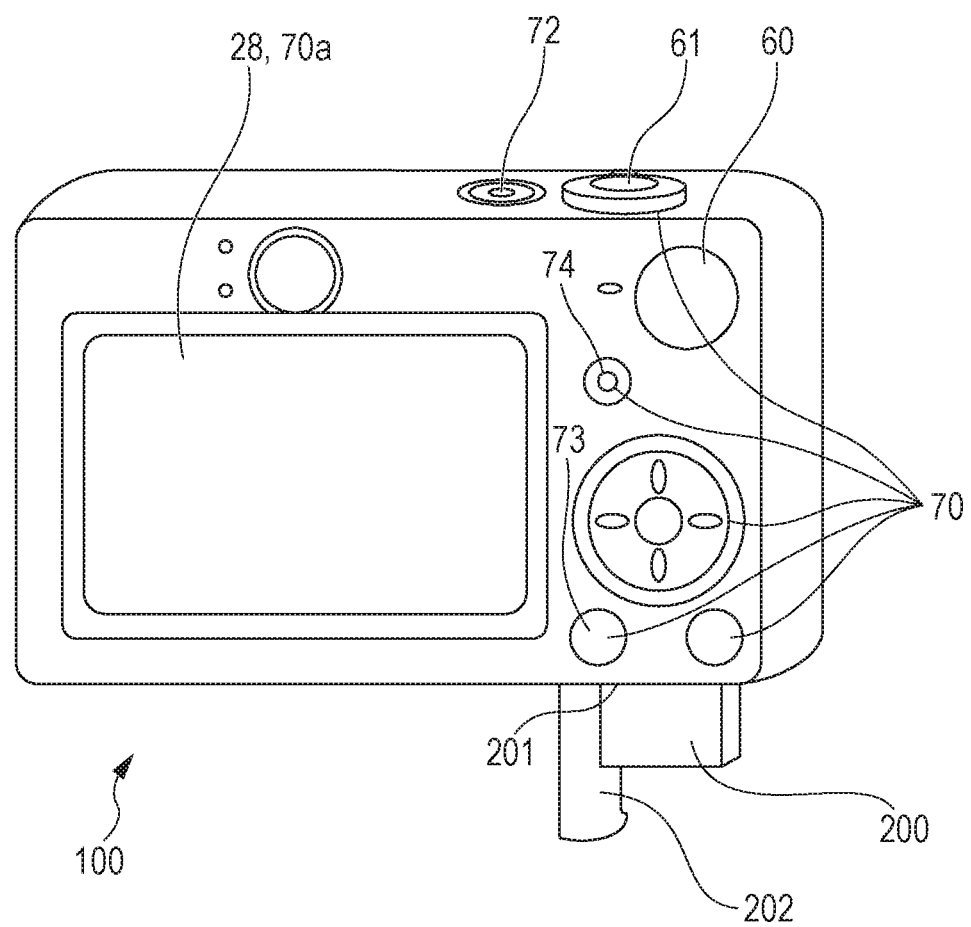
FIG. 1A is a diagram illustrating a digital camera as an example of an apparatus to which a configuration of the present embodiment can be applied.
Figure 1B:
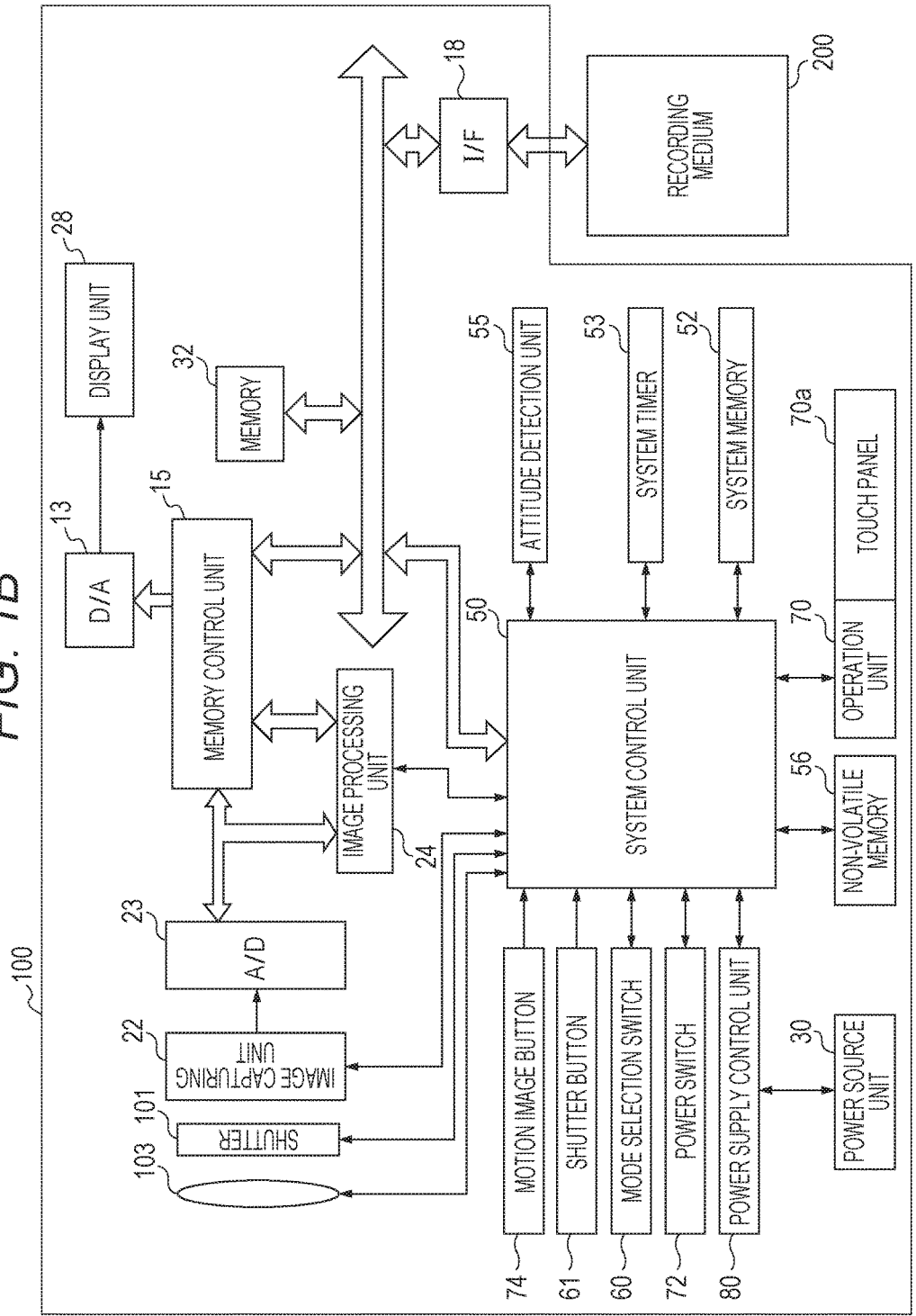
FIG. 1B is a block diagram illustrating an example of a configuration of a digital camera as an example of an apparatus to which a configuration of the present embodiment can be applied.

FIG. 1A is a diagram illustrating a digital camera 100 as an example of a display control apparatus, and FIG. 1B is a block diagram illustrating an example of a configuration of the digital camera 100 as an example of a display control apparatus. A display unit 28 is a display unit for displaying images and various information. A shutter button 61 is an operation unit for providing an image capturing instruction (still image) (when pressed, an image capturing instruction is received in the first step and an image is captured in the second step). In addition, there is a motion image button 74 for providing an image capturing instruction for capturing a motion image in addition to the shutter button 61. A mode selection switch 60 is an operation unit for selecting various modes. An operation unit 70 is an operation unit including operation unit members such as switch, button, and touch panel for receiving various operation from a user. A menu button 73 is a button for switching display and non-display of a menu screen. A power switch 72 is a pressing button for switching power-on and power-off. A recording medium 200 is a non-volatile recording medium such as memory card and hard disk. A recording medium slot 201 is a slot for holding the recording medium 200. The recording medium 200 held in the recording medium slot 201 can communicate with the digital camera 100 and can record and reproduce. A cover 202 is a cover of the recording medium slot 201. In the figure, the cover 202 is opened and part of the recording medium 200 is pulled and exposed from the slot 201.

In FIG. 1B, a photographing lens 103 is a lens group including zoom lens and focus lens. A shutter 101 is a shutter with diaphragm function. An image capturing unit 22 is an image capture element including CCD and CMOS element for converting an optical image to an electrical signal. An A/D converter 23 is used for converting an analog signal output from the image capturing unit 22 to a digital signal.

An image processing unit 24 performs certain pixel interpolation, resizing processing such as size reduction, and color conversion processing on the data from the A/D converter 23 or the data from a memory control unit 15. In addition, in the image processing unit 24, certain calculation processing is performed with the captured image data, and a system control unit 50 performs exposure control and ranging control on the basis of the obtained calculation result. Accordingly, AF (auto focus) processing, AE (auto exposure) processing, and EF (pre-flashing) processing of TTL (through the lens) method are performed. Moreover, in the image processing unit 24, certain calculation processing is performed with the captured image data and AWB (auto white balance) processing of TTL method is also performed on the basis of the obtained calculation result.

The output data from the A/D converter 23 is directly written in a memory 32 via the image processing unit 24 and the memory control unit 15 or via the memory control unit 15 without the image processing unit 24. The memory 32 stores image data obtained by the image capturing unit 22 and converted to digital data by the A/D converter 23 and image data to be displayed on the display unit 28. The memory 32 has storage capacity sufficient for storing predetermined number of still images, motion images for a predetermined time, and sound.

In addition, the memory 32 also serves as a memory for image display (video memory). A D/A converter 13 converts data for image display stored in the memory 32 to an analog signal and supplies it to the display unit 28. Accordingly, the image data for display written in the memory 32 is displayed on the display unit 28 via the D/A converter 13. The display unit 28 makes a display on a display device such as LCD in accordance with the analog signal from the D/A converter 13. The digital signal once A/D-converted by the A/D converter 23 and stored in the memory 32 is analog-converted by the D/A converter 13, and it is sequentially transmitted to the display unit 28 to be displayed. Accordingly, it functions as electronic viewfinder and live view image display (live view display) can be performed.

A non-volatile memory 56 is a memory as a recording medium in which data is electronically erased, recorded, and read by the system control unit 50 including a computer, and EEPROM is used therefor, for example. The non-volatile memory 56 stores constant for operating the system control unit 50, a program, and the like. Program mentioned here is a computer program that executes various process in the flow charts described later in the present embodiment.

The system control unit 50 controls the entire digital camera 100. Each process of the present embodiment described later is realized by executing the program stored in the non-volatile memory 56 described above. RAM is used for a system memory 52. In the system memory 52, constant and variable for operating the system control unit 50, the program read from the non-volatile memory 56, and the like are developed. In addition, the system control unit 50 also controls display by controlling the memory 32, the D/A converter 13, the display unit 28, and the like.

The system timer 53 is a time measurement unit for measuring time used for various control and time of an inner clock.

The mode selection switch 60 described later, the shutter button 61 for providing an image capturing instruction, and the operation unit 70 are operation units for providing various operation instructions to the system control unit 50. The mode selection switch 60 switches the operation mode of the system control unit 50 to any of manual mode, program mode, auto mode, diaphragm priority mode, and the like.

Each operation unit member of the operation unit 70 is appropriately given a function based on the case by selecting various functional icons displayed on the display unit 28 and functions as a function button. The type of function button includes, for example, termination button, return button, image forward button, jump button, narrowing-down button, and attribute change button. For example, when a menu button is pressed, a menu screen for setting various issues is displayed on the display unit 28. The user can intuitively make various settings with the menu screen displayed on the display unit 28 and four-direction buttons of up, down, right, and left and a SET button.

The power supply control unit 80 includes a battery detecting circuit, a DC-DC converter, and a switch circuit for switching a block in which electricity is conducted, and detects whether or not a battery is loaded, type of a battery, and remaining battery capacity (battery remaining capacity). When the remaining capacity is less than the predetermined value (for example, less than 10%), a guide (display object) indicating that the remaining capacity is little is displayed on the display unit 28 via the system control unit 50. In addition, the power supply control unit 80 controls the DC-DC converter on the basis of the detection result and an instruction of the system control unit 50 and supplies necessary voltage to each unit including the recording medium 200 for a necessary period. The power switch 72 is a button for switching ON and OFF of the power of the digital camera 100.

A power source unit 30 includes a primary battery such as alkali battery and lithium battery, a secondary battery such as NiCd battery, NiMH battery, and Li battery, and an AC adopter. A recording medium I/F 18 is an interface with the recording medium 200 such as memory card and hard disk. The recording medium 200 is a non-volatile recording medium for recording an image that is being captured such as memory card, and includes a semiconductor memory, an optical disk, and a magnetic disk. When the capacity for recording in the recording medium 200 becomes less and captured images to be made cannot be recorded, a guide indicating that recording is no longer possible is displayed on the display unit 28 via the recording medium I/F 18.

An attitude detection unit 55 detects (can detect) an attitude, or orientation, of the digital camera 100 against the direction of gravitational force. Display of icons and the like can be switched and displayed in the direction for the user to easily see according to the direction or orientation (attitude) of the digital camera 100 detected by the attitude detection unit 55. As the attitude detection unit 55, an acceleration sensor or a gyro sensor can be used.

Figure 2A:
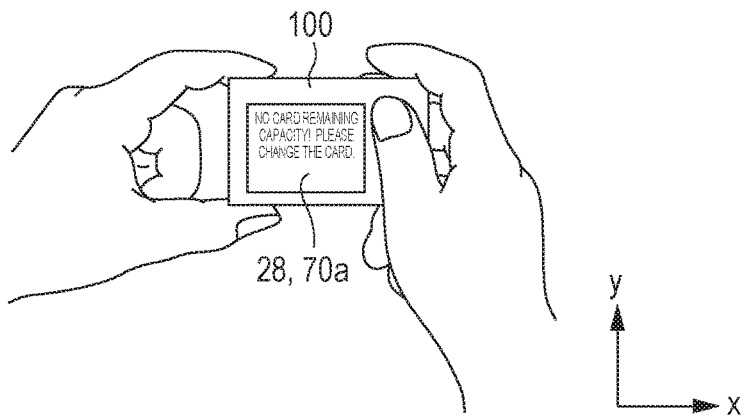
FIGS. 2A to 2C illustrate a digital camera and a display unit for describing the present embodiment.
Figure 2B:
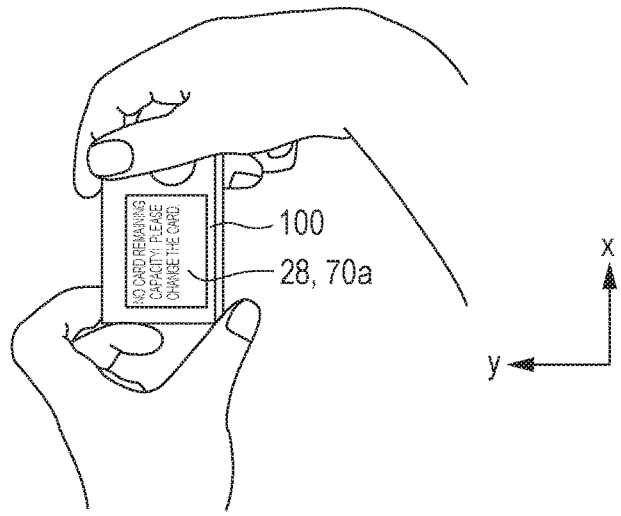
Figure 2C:
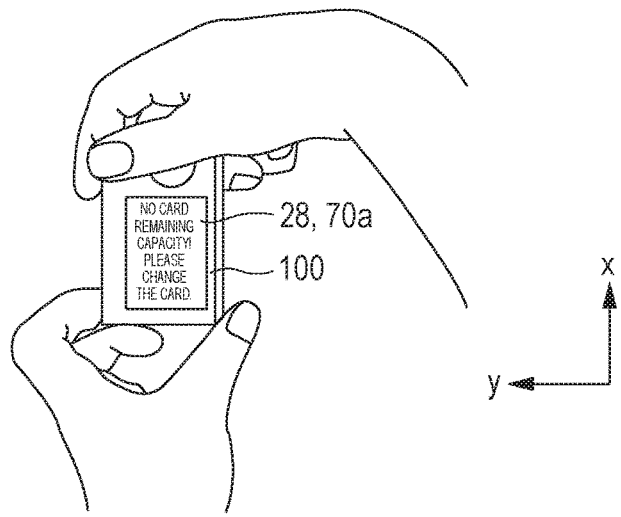

FIGS. 2A to 2C are drawings for describing rotation of the digital camera 100 and display of the display unit 28 when the digital camera 100 is rotated. In one embodiment, the rotation is with respect to one rotation axis, e.g., the vertical axis, such that the face of the display remains facing to the same direction. FIGS. 2A and 2B illustrate an example of display when the present embodiment is applied and FIG. 2C illustrates an example of display when the present embodiment is not applied. The direction of the digital camera 100 in FIG. 2A is referred to as normal position (rotation angle of 0 degree) and the reference of rotation of the digital camera 100 is the normal position. In the normal position, the long side out of the two sides (which are short side direction and long side direction) forming the rectangle shape of the display unit 28 extends along the lateral direction as seen from the user (that is, perpendicular to the direction of gravitational force). FIG. 2A illustrates an example of a guide indicating that there is no card remaining capacity on the display unit 28. When a guide with description is shown, a text is displayed in many cases to appropriately notify the user of the content of a warning, a guide, and the like. In addition, as for digital camera, a motion image is captured with the horizontally-long aspect ratio in many cases and the aspect ratio of the display unit is also horizontally long in many cases. As described, when a text is displayed as a guide on the horizontally-long display unit, the guide is easily read if the user holds the display unit 28 in horizontally-long (state of FIG. 2A). On the other hand, if the user holds the display unit 28 vertically-long (attitude obtained by rotating 90 degrees, or substantially close to 90 degrees, from the normal position), patterns of display method illustrated in FIGS. 2B and 2C are possible. FIGS. 2B and 2C illustrate an example when the digital camera 100 is held by rotating 90 degrees, or substantially close to 90 degrees, (from the reference position in FIG. 2A), and at this time, the display unit 28 becomes vertically long as seen from the user. The case in which the display unit 28 is further rotated in the right direction by 90 degrees, or substantially close to 90 degrees, as seen from the user from the rotation angle 90 degrees, or substantially close to 90 degrees, illustrated in FIGS. 2B and 2C is referred to as 180 degrees, or substantially close to 180 degrees, (reverse position, or attitude in which upper side and lower side are switched from the normal position), and the case in which the display unit 28 is further rotated from 180 degrees is referred to 270 degrees, or substantially close to 270 degrees. In case of the rotation angle 90 degrees and rotation angle 270 degrees, the display unit 28 is vertically long as seen from the user and in case of the rotation angle 0 degree (normal position) and 180 degrees (reverse position), the display unit 28 is horizontally long as seen from the user. Note that, even if the degree of rotation of the digital camera 100 is not accurately 0 degree or 90 degrees, it may be possible to consider that ±45 degrees of 0 degree is 0 degree.

FIG. 2A illustrates an example of display when the digital camera 100 is in the normal position and a text is displayed in three lines since the display area is horizontally long. If the text is displayed horizontally long like this, the user can easily read the text since words and conjunctive words included in the text are not cut. FIG. 2B illustrates an example of display when the digital camera 100 is in the vertical position. Although the display area is vertically long, the text is displayed in three lines also in this case while the characters are not rotated from the case of the normal position. When the text is rotated by 90 degrees, or substantially close to 90 degrees, and displayed horizontally long, there are a few line breaks, but it is possible that it takes some time for the user to read the text since the characters are rotated by 90 degrees, or substantially close to 90 degrees. On the other hand, as illustrated in FIG. 2C, when the characters are rotated by 90 degrees, or substantially close to 90 degrees, and displayed in accordance with the width of the vertically-long display area, there are more line breaks since the number of characters that can be displayed in one line is less than the case of the normal position. Therefore, it is difficult to understand the relevance in the text as the line is broken in the middle of a word or a conjunctive word is in the next line. Therefore, it is highly possible that the user is back to the previous line many times and read again or skip a word by mistake, and also, it is possible that the user misunderstand the content of the text.

Specifically, in the time-limited display in which display of an object is automatically cancelled after a predetermined time has passed since the object starts to be displayed, there may be problems such as shortage of the battery, impossibility of recording, and influence to operation if display of the object is cancelled when the user does not yet understand the content of the text. Therefore, in the present embodiment, when an object is displayed with time limitation in the case of the vertical position, the display is not changed from the case of the normal position as illustrated in FIG. 2B so that the user can easily read the text. In addition, when the text is displayed so that the user can easily read as illustrated in FIG. 2B, the display time of time-limited display is set longer than the case of the normal position since the characters are rotated by 90 degrees.

Figure 3A:
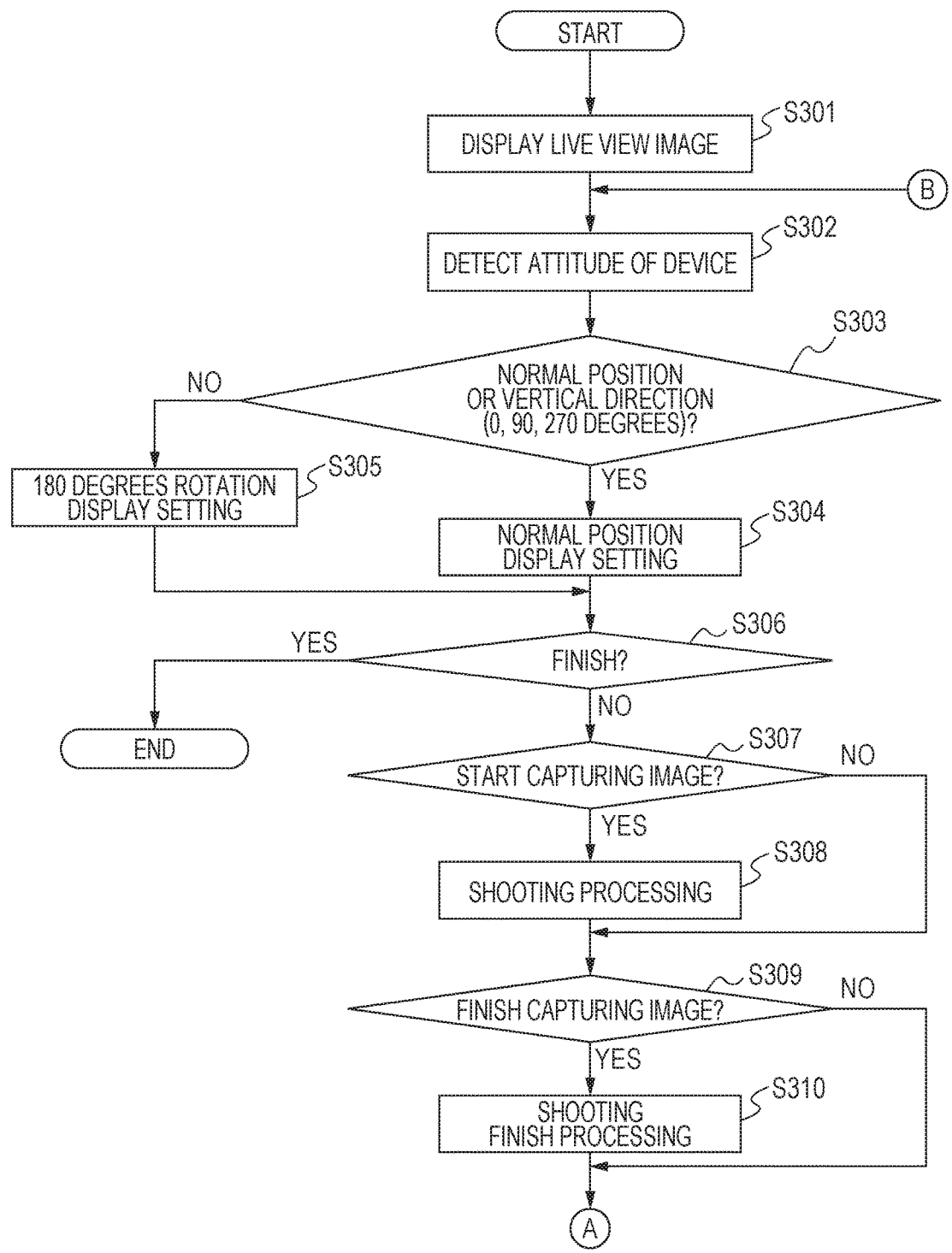
FIGS. 3A and 3B are a flow chart showing display processing according to the present embodiment.
Figure 3B:
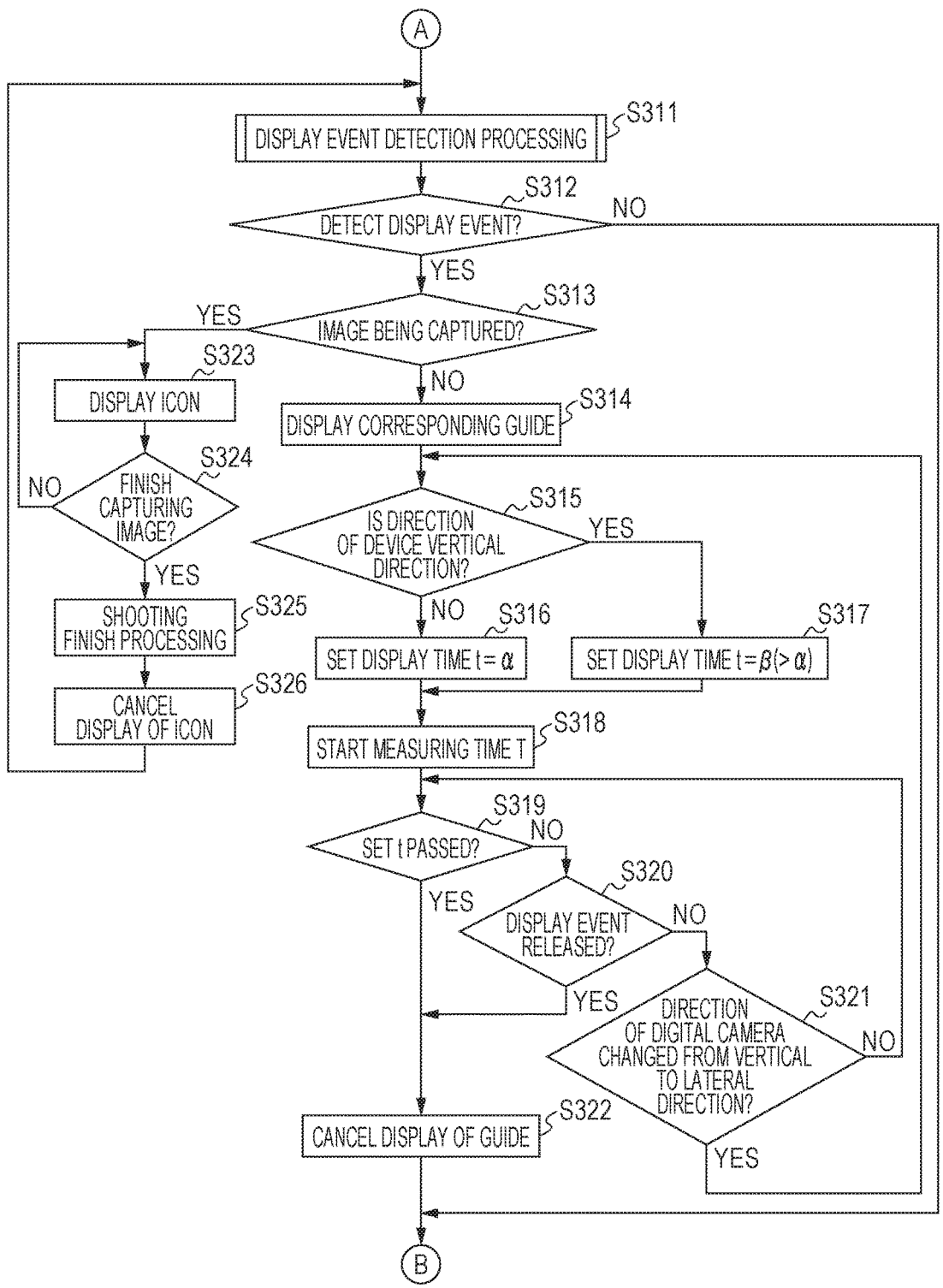

Next, the display processing according to the present embodiment will be described with reference to FIGS. 3A and 3B. This process is realized when the program stored in the non-volatile memory 56 is developed to the system memory 52 and executed by the system control unit 50. Note that, this process is started when the power of the digital camera 100 is turned on and it becomes possible to display an object on the display unit 28.

Figure 5A:
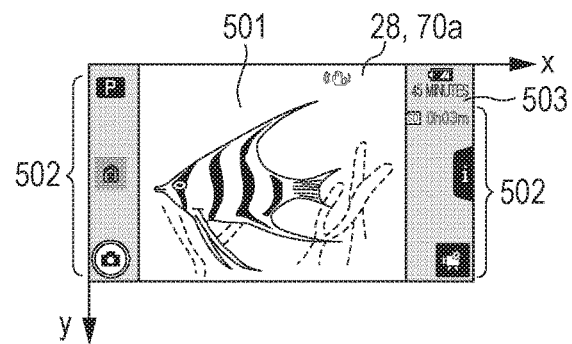
FIGS. 5A to 5H illustrate an example of a display unit according to the present embodiment.

In S301, the system control unit 50 displays a live view image on the display unit 28. FIGS. 5A to 5H illustrate examples of display according to the present embodiment, and as illustrated in FIG. 5A, a live view image 501 (captured image, live image) is displayed on the display unit 28. Note that, FIG. 5A illustrates an example of display on the display unit 28 when the digital camera 100 is held by the user in the normal position (rotation angle 0 degree).

In S302, the system control unit 50 detects the attitude (direction) of the digital camera 100. The direction of the digital camera 100 can be detected by the attitude detection unit 55.

In S303, the system control unit 50 determines whether the direction of the digital camera 100 detected in S302 is in the normal position or the vertical position (rotation angle 0 degree, 90 degrees, 270 degrees) or the reverse position (rotation angle 180 degrees). When it is determined that the direction of the digital camera 100 is included in one of the normal position and the vertical direction, the process proceeds to S304 and the process proceeds to S305 if not.

Figure 5B:
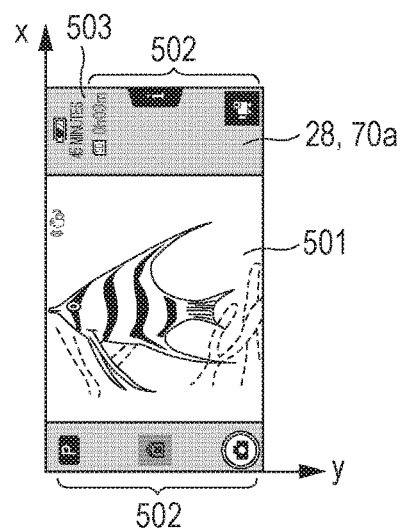

In S304, the system control unit 50 makes a setting so that an object is displayed on the display unit 28 in the direction of the case of the normal position (this is direction of display of characters, symbols, and the like and live view images are not included). That is, display of an icon and the like on the display unit 28 is not changed from the case of the normal position even when the rotation angle is 90 degrees and 270 degrees. FIG. 5A illustrates an example of display in the normal position and FIG. 5B illustrates an example of display in the vertical position (rotation angle 90 degrees) on the display unit 28 as seen from the user). The icons 502 displayed in the normal position in FIG. 5A are not rotated with respect to the display unit 28 and the display location thereof is not changed as well even in the case of the rotation angle of 90 degrees illustrated in FIG. 5B. However, since the direction of the image capturing unit 22 is changed in accordance with the rotation of the digital camera 100, the direction of the object against the image capturing unit 22 is also changed. As a result, the direction of the object in the live view image 501 displayed on the display unit 28 is constant as seen from the user regardless of the attitude of the digital camera 100.

In S305, the system control unit 50 rotates objects other than the live view image on the display unit 28 by 180 degrees and displays them (up-down and right-left reverse). An object is rotated by 180 degrees and displayed since the user rotates the digital camera 100 by 180 degrees and it is difficult to read the characters and the symbols if the normal position is kept.

In S306, the system control unit 50 determines whether or not to finish the display processing. The display processing is finished by turning off the power by pressing of the power switch 72 or shortage of the capacity of the power source unit 30. When it is determined that the display processing is to be finished, the display processing is finished and the process proceeds to S307 if not.

In S307, the system control unit 50 determines whether or not an instruction to start capture of a motion image is provided. An instruction to start capture of a motion image is given by pressing the motion image button 74. Note that, the determination of S307 is not made if capture of a motion image has already started and the process proceeds to S309. When it is determined that an instruction to start capture of a motion image is provided, the process proceeds to S308 and the process proceeds to S309 if not.

Figure 5C:
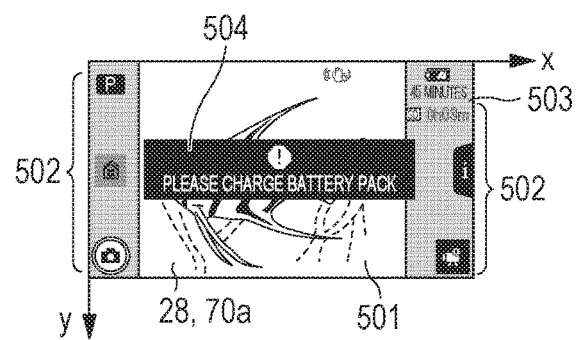
Figure 5D:
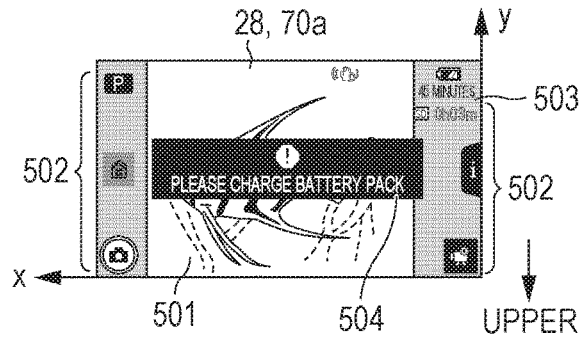
Figure 5E:
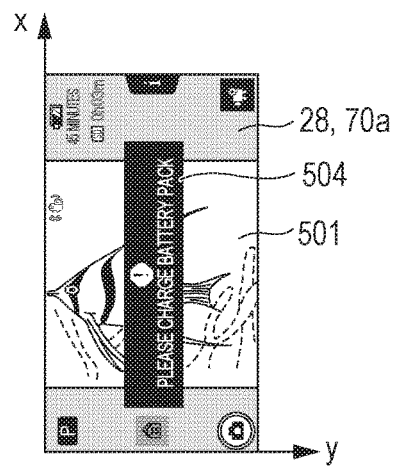
Figure 5F:
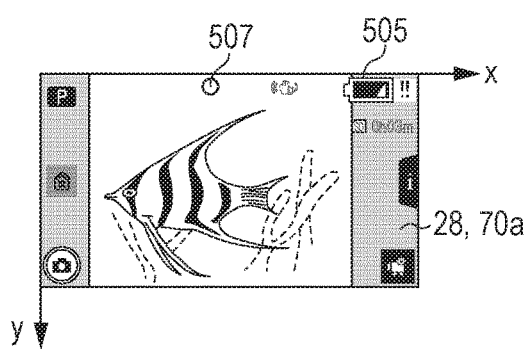

In S308, the system control unit 50 performs shooting processing of a motion image. Note that, the shooting processing of a motion image is continuously performed until an instruction to finish capture of a motion image is provided in S309 or S324. The shooting processing of a motion image is to store the image captured by the image capturing unit 22 in the recording medium 200. At this time, sound obtained by an audio recording unit (not illustrated) is also stored. When capture of a motion image is started, a mark 507 indicating that a motion image is being captured is displayed on the display unit 28 as illustrated in FIG. 5F.

In S309, the system control unit 50 determines whether or not an instruction to finish capture of a motion image is provided. An instruction to finish capture of a motion image is provided by pressing the motion image button 74. Note that, when capture of a motion image is not started, the determination of S309 is not made and the process proceeds to S311. When it is determined that an instruction to finish capture of a motion image is provided, the process proceeds to S310 and the process proceeds to S311 if not.

In S310, the system control unit 50 performs shooting finish processing. The shooting finish processing is to make attribute information, inter-frame information, and thumbnail of a motion image and to reproduce the motion image thus made by performing compression processing and the like. These pieces of information are stored in the recording medium 200 together with the motion image.

In S311, the system control unit 50 performs display event detection processing. The process for detecting a display event will be described with reference to FIGS. 4A and 4B.

In S312, the system control unit 50 determines whether or not a display event is detected in S311. When it is determined that a display event is detected, the process proceeds to S313 and the process goes back to S302 if not.

In S313, the system control unit 50 determines whether or not a motion image is being captured. When it is determined that a motion image is being captured, the process proceeds to S323, and the process proceeds to S314 if not.

In S314, the system control unit 50 displays a guide corresponding to the display event detected in S311 on the display unit 28. FIG. 5C illustrates an example of display when insufficiency of the battery remaining capacity (insufficiency of the remaining battery capacity) is detected in S311 when the digital camera 100 is in the normal position, and a guide 504 indicating that the battery pack needs to be charged is displayed. In addition, FIG. 5D illustrates an example when the digital camera 100 is in the reverse position (rotated by 180 degrees) and illustrates the display unit 28 as seen from the user, and the upper direction of the actual display unit 28 (0 degree) is the direction indicated by an arrow as "upper" in FIG. 5D. Since the digital camera 100 and the display unit 28 themselves are rotated by 180 degrees in FIG. 5D, the guide 504 is displayed on the display unit 28 by being reversed in up-down and right-left from the display of the guide 504 in the case of 0 degree so that the user can easily read the characters and the symbols as described in S305 above. FIG. 5E illustrates an example of display of the display unit 28 seen from the user when the digital camera 100 is in the vertical position (rotated by 90 degrees). Since display is made in the same display direction as the normal position in the case of FIG. 5E as described in S304 above, the guide 504 is not rotated with respect to the display unit 28 to be displayed. That is, as illustrated in FIGS. 5C and 5D, when the digital camera 100 is in the normal position or the reverse position, since the up-down of the display unit 28 as seen from the user matches the up-down of the characters, the user can easily read the characters. On the other hand, in the case of the vertical position as in FIG. 5E, the up-down of the display unit 28 as seen from the user does not match the up-down of the characters, and the characters are displayed vertically long (as seen from the user) as rotated by 90 degrees as seen from the user.

In S315, the system control unit 50 determines whether the direction of the digital camera 100 is the vertical direction (rotation angle 90 degrees, 270 degrees) or not (rotation angle 0 degree, 180 degrees). That is, the system control unit 50 determines whether or not the direction of the digital camera 100 is the vertical direction (vertical position) different from the lateral direction (normal position) by 90 degrees. When it is determined that the direction of the digital camera 100 is the vertical direction, the process proceeds to S317, and the process proceeds to S316 if not.

In S316, the system control unit 50 sets the display time t of the guide 504 displayed in S314 as a. The guide 504 is displayed with time limitation in S314 and disappears after some time even if the user does not make any operation after it is displayed. α is time such as four and five seconds. Time-limited display is display for giving the user a warning and information, and it disappears when a predetermined period has passed and the user recognizes it because the live view image 501 and icons and the like originally displayed on the display unit become difficult to be seen if it continues to be displayed.

In S317, the system control unit 50 sets the display time t of the guide 504 displayed in S314 as β (>α). β is set longer than a of the display time t set in S316. β is a value such as eight and six seconds. S317 is to set the display time t when it is determined in S315 that the direction of the digital camera 100 is the vertical direction. Since the display unit 28 is in the vertical position and the characters are displayed as being rotated by 90 degrees as seen from the user, it is highly possible that it takes more time for the user to read the characters in the vertical position than in the normal position as described above. Therefore, setting the display time t longer makes it possible for the user to easily understand the content of the text even in the vertical position.

In S318, the system control unit 50 starts to measure a time T. The time T is a time to determine whether or not the display time t has passed and the time T is measured by the system timer 53.

In S319, the system control unit 50 determines whether or not the time T that is started to be measured in S318 has exceeded the display time t set in S316 or S317. When it is determined that it has exceeded the set display time t, the process proceeds to S322 and the process proceeds to S320 if not.

In S320, the system control unit 50 determines whether or not a display event is released. A display event is released when the battery pack is exchanged with a battery pack fully charged in the case of the guide 504 regarding battery pack illustrated in FIGS. 5C to 5E, for example. When there is no remaining capacity of the recording medium, display of the guide is cancelled if it becomes possible to capture an image with a recording medium with sufficient remaining capacity. In addition, it is possible to release the display event by touch operation to the display unit 28 and pressing of the shutter button 61 regardless of the content of the guide (factor of the display event). When it is determined that the display event is released, the process proceeds to S322, and the process proceeds to S321 if not.

In S321, the system control unit 50 determines whether or not the direction of the digital camera 100 is changed from the vertical position (90 degrees or 270 degrees) to the normal position or the reverse position (0 degree or 180 degrees). When it is determined that the direction of the digital camera 100 is changed from the vertical position to the normal position or the reverse position (that is, the direction of display is changed from vertically long to horizontally long), the process goes back to S315 and the process goes back to S319 if not. That is, when the display unit 28 is changed from vertically long to horizontally long, the display time t is set again and display of the guide 504 is cancelled after a has passed since the direction is changed to horizontally long as it is highly possible that the user has changed the display unit 28 to horizontally long so as to easily read the text. Note that, when the direction of the digital camera 100 is changed from the vertical position to the reverse position, the direction of display is also updated. The display time t is not set again if the change is from the normal position or the reverse position to the vertical position even if the attitude is changed since it is highly possible that the user has changed the direction while understanding the guide.

In S322, the system control unit 50 cancels display of the guide 504. That is, display of the guide 504 is cancelled if the set display time t has passed or the display event is released.

Next, the process when it is determined in S313 that an image is being captured after detecting the display event will be described with reference to S323 to S326.

In S323, the system control unit 50 displays an icon. FIG. 5F illustrates an example of display when the battery becomes insufficient while capturing an image and an icon 505 is an icon indicating that the battery is insufficient. As illustrated, the icon 505 is displayed larger than the icon 503 indicating the normal remaining battery capacity and a symbol attracting the user is also displayed. The form of the display of the icon 505 is not necessarily as illustrated and the color and the shape may be changed. If the guide 504 is displayed over the captured image while capturing an image, visibility of the object being captured becomes low and it is possible that the user finishes capturing an image at incorrect timing or changes the capturing setting to an incorrect value. Therefore, the icon is displayed not over the captured image but for the user to recognize the content of the display event so that there is no influence to the recorded image while capturing an image.

In S324, the system control unit 50 determines whether or not an instruction to finish capture of an image is provided as with S309. When it is determined that an instruction to finish capture of an image is provided, the process proceeds to S324 and the process proceeds to S323 if not.

In S325, the system control unit 50 performs shooting finish processing as with S310.

In S326, the system control unit 50 cancels display of the icon that is displayed in S323.

Figure 4B:
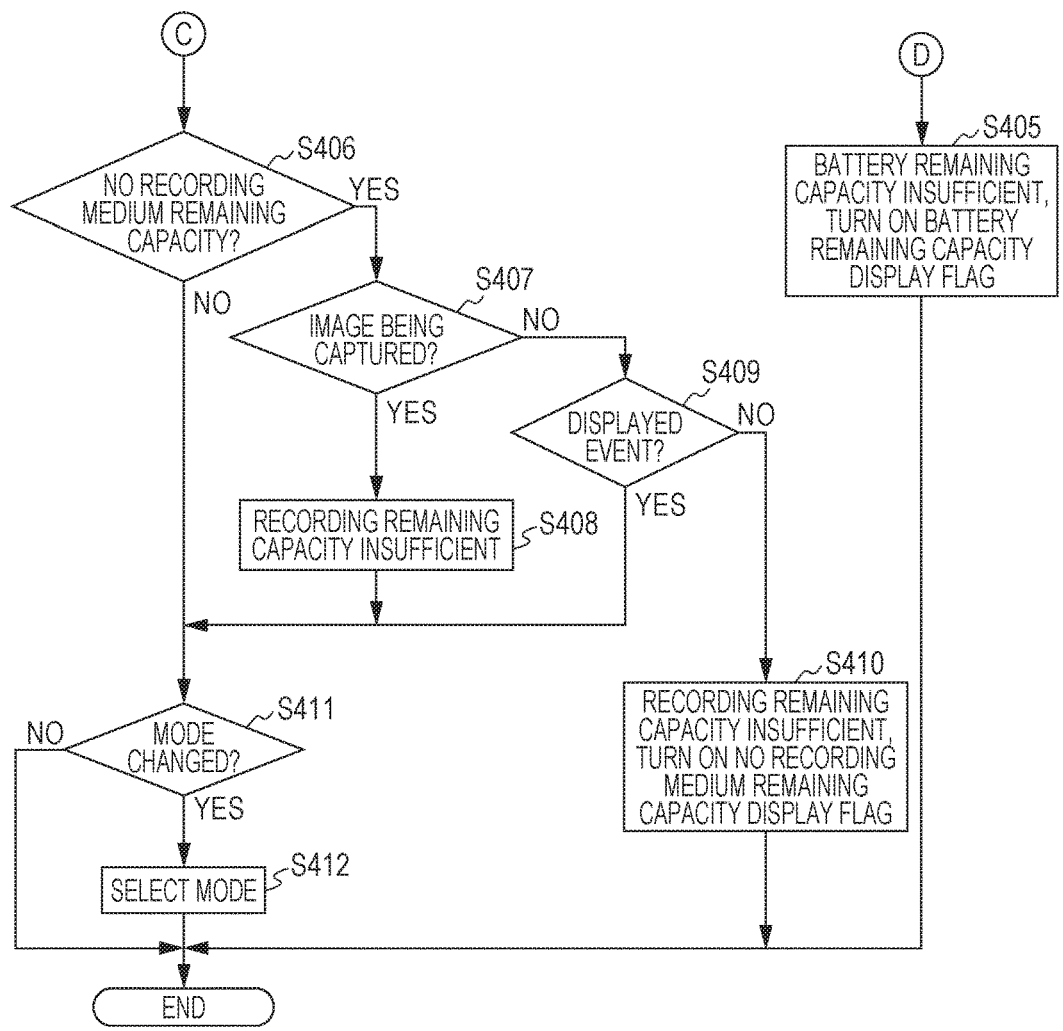

Next, display event detection processing will be described with reference to FIGS. 4A and 4B. This processing is realized by developing the program stored in the non-volatile memory 56 to the system memory 52 and executing the program by the system control unit 50. Note that, this processing starts when the process proceeds to S311 of FIG. 3B.

In S401, the system control unit 50 determines whether or not the battery remaining capacity has become less than 10%. The battery remaining capacity can be determined by receiving information from the power supply control unit 80. When it is determined that the battery remaining capacity is less than 10%, the process proceeds to S402, and the process proceeds to S406 if not.

In S402, the system control unit 50 determines whether or not a motion image is being captured. When it is determined that a motion image is being captured, the process proceeds to S403, and the process proceeds to S404 if not.

In S403, the system control unit 50 causes the system memory 52 to store a display event that the battery remaining capacity is insufficient.

In S404, the system control unit 50 determines whether or not it is a displayed event. Whether or not it is a displayed event is determined by referring to a flag stored in the system memory 52. That is, it is determined whether or not a guide corresponding to the display event already detected is displayed. Since a guide is not displayed and an icon is displayed when an image is being captured (S402 Yes), the determination of S404 is not made and an icon is displayed. When it is determined that it is a displayed event, the process proceeds to S406, and the process proceeds to S405 if not.

In S405, the system control unit 50 causes the system memory 52 to store a display event that the battery remaining capacity is insufficient and turns on the battery remaining capacity display flag. The battery remaining capacity display flag becomes off when the battery is changed and the battery remaining capacity becomes sufficient.

In S406, the system control unit 50 determines whether or not there is no recording remaining capacity. "There is no recording remaining capacity" means that the recording capacity of the recording medium 200 will be full in twenty seconds if motion images continue to be captured with the current capturing setting and it is not possible to record more, for example.

In S407, the system control unit 50 determines whether or not a motion image is being captured. When it is determined that a motion image is being captured, the process proceeds to S408, and the process proceeds to S409 if not.

In S408, the system control unit 50 causes the system memory 52 to store a display event that the recording remaining capacity is insufficient.

In S409, the system control unit 50 determines whether or not it is a displayed event. When it is determined that it is a displayed event, the process proceeds to S411, and the process proceeds to S410 if not.

In S410, the system control unit 50 causes the system memory 52 to store a display event that the recording remaining capacity is insufficient and turns on the recording remaining capacity display flag. The recording remaining capacity display flag becomes off when the recording medium 200 is changed and the recording remaining capacity becomes sufficient.

In S411, the system control unit 50 determines whether or not mode change operation is performed. The mode change operation can be performed by rotating the mode selection switch 60. When it is determined that the mode change operation is performed, the process proceeds to S412, and process of detecting a display event is finished if not.

Figure 5G:
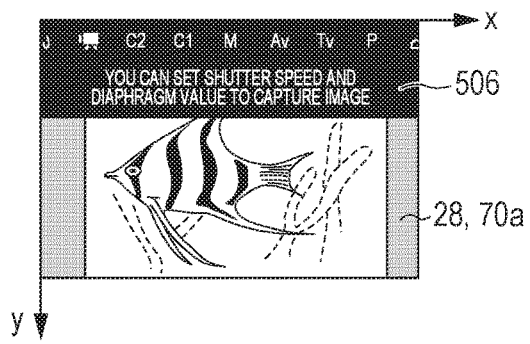

In S412, the system control unit 50 selects a mode and causes the system memory 52 to store a display event that a mode is selected. A mode is selected many times and a flag is not turned on since the user cannot understand which mode is on if display of the guide is cancelled even if the guide is once displayed. In addition, since the mode change operation is not performed while capturing an image, a guide (text) is displayed without determining whether or not an image is being captured. FIG. 5G illustrates an example of the guide 506 in the case of mode switching and FIG. 5G illustrates an example of display in the case of normal position. Also in the case of the guide 506 of mode switching, the display time t becomes longer in display in the vertical position than display in the normal position of FIG. 5G.

In the embodiment described above, visibility of the text displayed with time limitation is improved regardless of the direction of the display unit. That is, the user can confirm the text displayed with time limitation in the horizontally long direction that the user easily read in the case of normal position or reverse position. In addition, in the case of vertical position, since the text is displayed so that the width of one line is longer as with the normal position, it is easy to understand relevance in the text and it is easy to read the text. Moreover, since the characters are rotated by 90 degrees as seen from the user and the display time t is set longer than the case of normal position (reverse position) even if it takes some time to read the characters, it is highly possible that the user can understand the content of the text while the text is displayed.

In addition, as described with reference to FIGS. 4A and 4B, since the guide 504 once displayed is not displayed many times even if the same display event consecutively occurs, visibility of a captured image and other icons is not lowered. Moreover, since the content of the display event is notified by an icon while an image is being captured, lowering of visibility and operability due to overlap of the guide on an image to be recorded is less likely occur. Furthermore, when the display direction and the location of the icon are set for every rotation angle of a device, the location of the icon is changed in accordance with the attitude of the device. Even though effort of the user to find a desired icon and process of changing display are required when the position of the icon is changed for every attitude, operability of the user can be improved and processing load can be lowered since these are not necessary in the embodiment described above.

In addition, while the display unit 28 is rectangle in the embodiment described above, it is not necessarily rectangle and may be square, circle, or another polygonal shape. That is, the present embodiment is effective even when display pattern is not set for every attitude in order to improve operability of the user and to lower the processing load for changing display in accordance with the attitude. That is, display is not changed even for the attitude obtained by rotating 90 degrees from the normal position, and the display time of display with time limitation is set longer than the case of normal position.

Figure 5H:
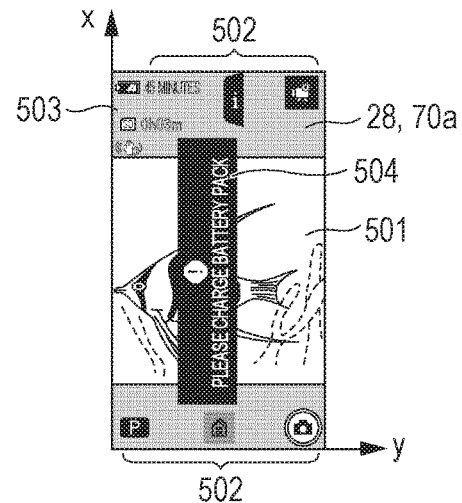

In addition, in the embodiment described above, an example in which an icon is displayed without changing its direction from the case of normal position even when the attitude of the digital camera 100 is the vertical position has been described as shown in S304. However, the direction of display of the icon may be changed (rotated) from the case of normal position when the attitude of the digital camera 100 is the vertical position. Since the display area of an icon is smaller than that of a guide and the number of characters is not as many as a text, difficulty in reading due to large number of line breaks as with a text does not occur. Therefore, it may be rotated and displayed in accordance with the direction of the digital camera 100. In this case, as illustrated in FIG. 5H, the direction of display of an icon is in accordance with the attitude of the digital camera 100 and a text such as guide is displayed in the same way as in the case of normal position even in the case of vertical position.

In addition, even in display of a text (line of characters) with time limitation, the display time a may be the same for normal position and vertical position if the number of characters in a text is less than a predetermined number (for example, five characters), and the time of display with time limitation may be changed for normal position and vertical position as described above if the number of characters exceeds the predetermined number.

Note that, although display of guide has been described in the present embodiment with examples of insufficiency of remaining battery capacity, insufficiency of recording remaining capacity, and mode selection, there are various display events. For example, if writing of a motion image to the recording medium 200 cannot made in time and motion image data is accumulated to exceed the temporary recording area (not illustrated) of the recording medium 200, it is determined that the recording buffer is full and a guide indicating that recording cannot continue any more is displayed. In addition, when an error occurs to a connected wireless connecting device and wireless connection cannot be made (stopped), a guide for confirming state of wireless connection is displayed.

In addition, although a case in which a text is displayed as a guide has been described in the present embodiment, there are other objects than a text that lower visibility when displayed in the direction in accordance with rotation of the display unit 28 in a vertically-long area. For example, since a bar used for setting a value lowers visibility when its size is reduced in accordance with the width of the display area in the case of vertical position, it becomes more difficult to read numbers and characters than in the case of normal position if the direction of display is not changed; however, visibility is improved if the display time t is set longer. Moreover, it can be applied in a case in which a list of thumbnails is displayed in line in the lateral direction. The number of thumbnails than can be displayed is reduced since the width of the display area in the case of vertical position becomes shorter than that in the case of normal position. However, an image captured in the normal position in particular is seen from the user as being rotated by 90 degrees if the lateral position is kept, it becomes difficult to understand the content of the image. Then, a time when the user can confirm the content of the thumbnail is secured by setting the display time t longer.

In addition, in the present embodiment, while the display time t in the case of vertical position is set longer in S317 than that in the case of normal position (reverse position), the display time t may be set in S317 as the same time a and the time T may not be measured in S318 when the process passes S317. That is, the object may continue to be displayed in the case of vertical position until there is operation from the user (cancellation of guide display by touch operation) by setting the display time t but not performing operation of subtraction. At this time, information that display of a guide can be cancelled by touch operation may be displayed. That is, a case in which only display of the guide 504 is cancelled according to time lapse does not occur. That is, process such as automatic display off that cancels display of the entire screen when operation is not made for a predetermined time (for example, one minute that is longer than the time t of display with time limitation), and process for cancelling display of the guide 504 only while maintaining display of objects other than the guide 504 is not performed.

Note that, the digital camera 100 may be controlled by one hardware and may be controlled by several hardware that perform different processing.

In addition, while the disclosure has been described with reference to the preferred embodiments, the disclosure is not limited to these specific embodiments, and various modes within the spirit of the disclosure are also included in the disclosure. Moreover, each embodiment described above is merely one embodiment of the disclosure, and embodiments may be combined with each other as appropriate.

In addition, a case in which the disclosure is applied to the digital camera 100 has been described in the embodiment described above, the disclosure is not limited to this example and may be applied to display control apparatus that displays an object with time limitation and can detect an attitude. That is, the disclosure can be applied to mobile phones, mobile image viewers, digital photo frames, music players, game machines, digital book readers, electronic dictionaries, smartphones, tablet PCs, and the like.

Other Embodiments

The disclosure is also realized by performing the following processing. That is, a software (program) that realizes functions of the embodiment described above is supplied to a system or a device via a network or various recording media, and a computer (or CPU, MPU, or the like) of the system or the device reads and executes the program code. In this case, the program and the recording medium storing the program are included in the disclosure.

According to the disclosure, visibility of a user can be improved regardless of the direction of a display unit when a display object with limited display time is to be displayed.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-110353, filed Jun. 1, 2016, which is hereby incorporated by reference herein in its entirety.

What is claimed is:

1. A display control apparatus comprising:
an attitude detection unit configured to detect an attitude of a display unit; and
a display control unit, in a first case where the attitude of the display unit detected by the attitude detection unit is a first attitude, configured to display a time-limited object in a display position with respect to the display unit for a limited time period and not to display the time-limited object after having displayed the time-limited object for a first period, and
in a second case where the attitude of the display unit detected by the attitude detection unit is a second attitude different from the first attitude by 90 degrees, configured to display the time-limited object without rotating the time-limited object with respect to the display unit and without changing the display position with respect to the display unit for a second period longer than the first period,
wherein the time-limited object is a guide with description.

2. The display control apparatus according to claim 1, wherein the display control unit does not display the time-limited object after having displayed the time-limited object for the second period in the second case.

3. The display control apparatus according to claim 1, wherein the display control unit displays an image different from the time-limited object on the display unit while displaying the time-limited object on the display unit during the first and second cases.

4. The display control apparatus according to claim 1, wherein the display unit is rectangle.

5. The display control apparatus according to claim 1, wherein the time-limited object is displayed in a long side direction longer than the time-limited object is displayed in a short side direction of the display unit in the first and second cases.

6. The display control apparatus according to claim 1, wherein the time-limited object is a text.

7. The display control apparatus according to claim 6, wherein the text is displayed in several lines.

8. The display control apparatus according to claim 1, wherein the direction of display of the time-limited object is not changed with respect to the display unit when the attitude of the display unit is changed from the first attitude to the second attitude.

9. The display control apparatus according to claim 1, wherein the display control unit inverts display of the time-limited object in the up-down and the right-left directions when the attitude of the display unit changes from the first attitude to a third attitude different from the first attitude by 180 degrees.

10. The display control apparatus according to claim 1, wherein display of the time-limited object is cancelled by an operation of a user even before the first period has passed.

11. The display control apparatus according to claim 1, wherein the time-limited object is displayed in accordance with occurrence of any of insufficiency of remaining battery capacity, insufficiency of capacity of a recording medium, stop of wireless connection, and change of mode.

12. The display control apparatus according to claim 1, further comprising an image capturing unit, wherein
the time of display of an image obtained by the image capturing unit on the display unit is the same when the attitude of the display unit is the first attitude and when the attitude of the display unit is the second attitude.

13. The display control apparatus according to claim 1, further comprising an image capturing instruction unit configured to provide an instruction to capture an image, wherein
when capture of an image started by the image capturing instruction unit is being performed, the display control unit does not display the time-limited object, and displays an icon with a smaller display area than the time-limited object corresponding to the time-limited object.

14. The display control apparatus according to claim 1, further comprising an event detection unit configured to detect the event corresponding to the time-limited object, wherein
once the time-limited object is displayed, the display control unit does not display the time-limited object many times when the event detection unit consecutively detects the event.

15. The display control apparatus according to claim 1, wherein
in a case where the attitude of the display unit changes from the second attitude to the first attitude while the time-limited object is being displayed, the display control unit displays the time-limited object for the first period since the attitude of the display unit changes to the first attitude, and
in a case where the attitude of the display unit changes from the first attitude to the second attitude while the time-limited object is being displayed, the display control unit cancels display of the time-limited object after having displayed the time-limited object for the first period.

16. The display control apparatus according to claim 1, wherein
the display control unit displays a display object not included in the time-limited object by rotating by 90 degrees in accordance with change of the attitude of the display unit from the first attitude to the second attitude.

17. A method for controlling a display control apparatus comprising:
detecting an attitude of a display unit;
in a first case where the attitude of the display unit detected in the detecting is a first attitude, displaying a time-limited object in a display position with respect to the display unit for a limited time period and not displaying the time-limited object after having displayed the time-limited object for a first period; and
in a second case where the attitude of the display unit detected in the detecting is a second attitude different from the first attitude by 90 degrees, displaying the time-limited object without rotating the time-limited object with respect to the display unit and without changing the display position with respect to the display unit for a second period longer than the first period,
wherein the time-limited object is a guide with description.

18. A non-transitory computer-readable recording medium storing a program that executes the method according to claim 17.

* * * * *